Feb. 23, 1960 F. W. CROTTY 2,926,019

PHONOGRAPH

Filed Nov. 22, 1957 4 Sheets-Sheet 1

Inventor
Francis W. Crotty
By John J. Pederson
Attorney

Feb. 23, 1960

F. W. CROTTY

PHONOGRAPH 2,926,019

Filed Nov. 22, 1957

4 Sheets-Sheet 2

Inventor
Francis W. Crotty
By John J. Pederson
Attorney

Feb. 23, 1960 F. W. CROTTY 2,926,019

PHONOGRAPH

Filed Nov. 22, 1957 4 Sheets-Sheet 3

Inventor
Francis W. Crotty
By John J. Pederson
Attorney

Feb. 23, 1960
F. W. CROTTY
2,926,019
PHONOGRAPH
Filed Nov. 22, 1957
4 Sheets-Sheet 4
Fig. 10
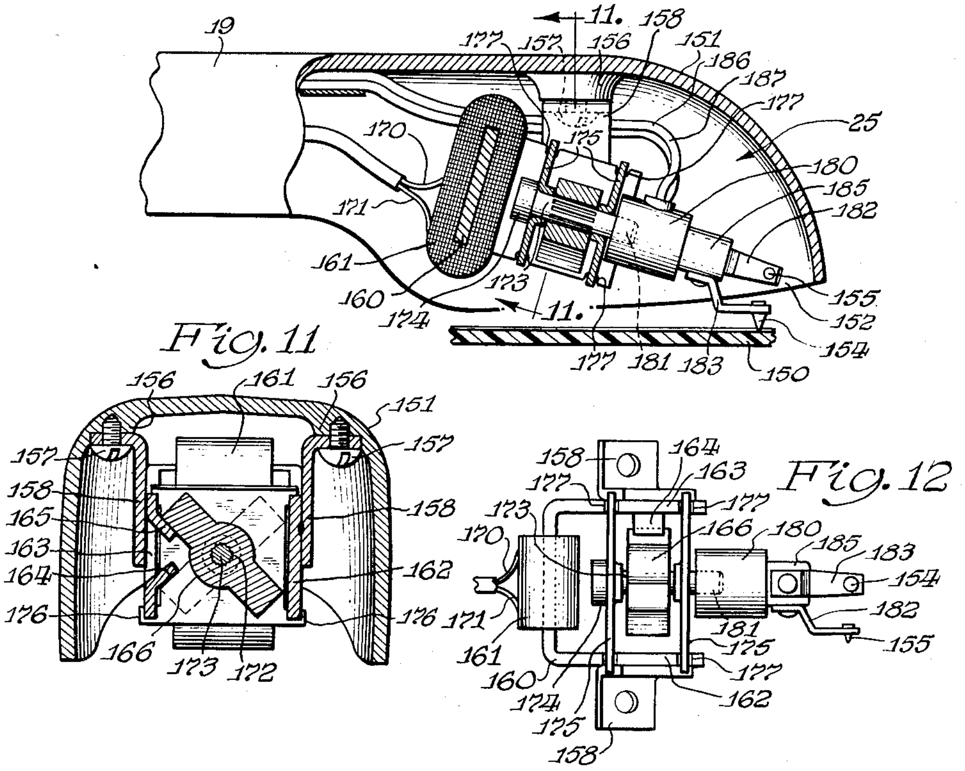
Fig. 11, Fig. 12
Fig. 14
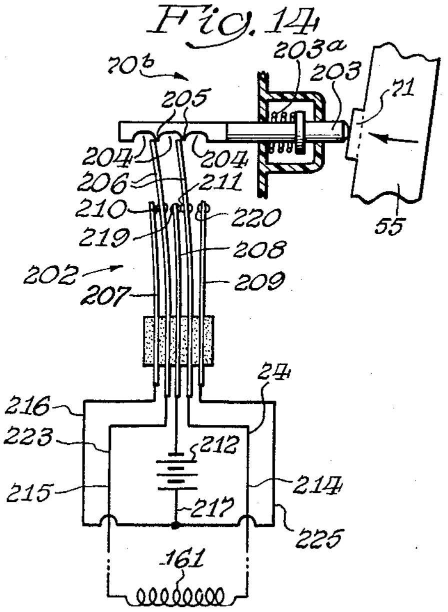
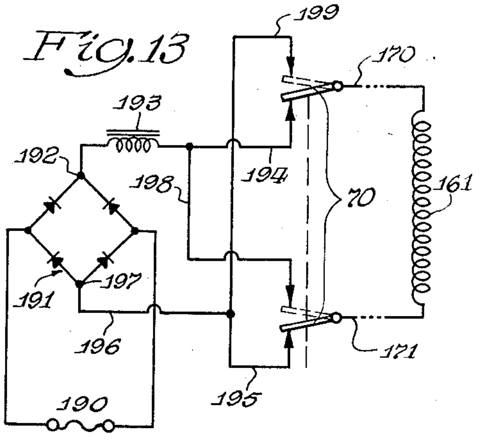
Fig. 13
Inventor
Francis W. Crotty
By John J. Pederson
Attorney

United States Patent Office 2,926,019

Patented Feb. 23, 1960

2,926,019

PHONOGRAPH

Francis W. Crotty, Park Ridge, Ill., assignor to Zenith Radio Corporation, a corporation of Delaware Application November 22, 1957, Serial No. 698,163

1 Claim. (Cl. 274—10)

Figures 1, 2:
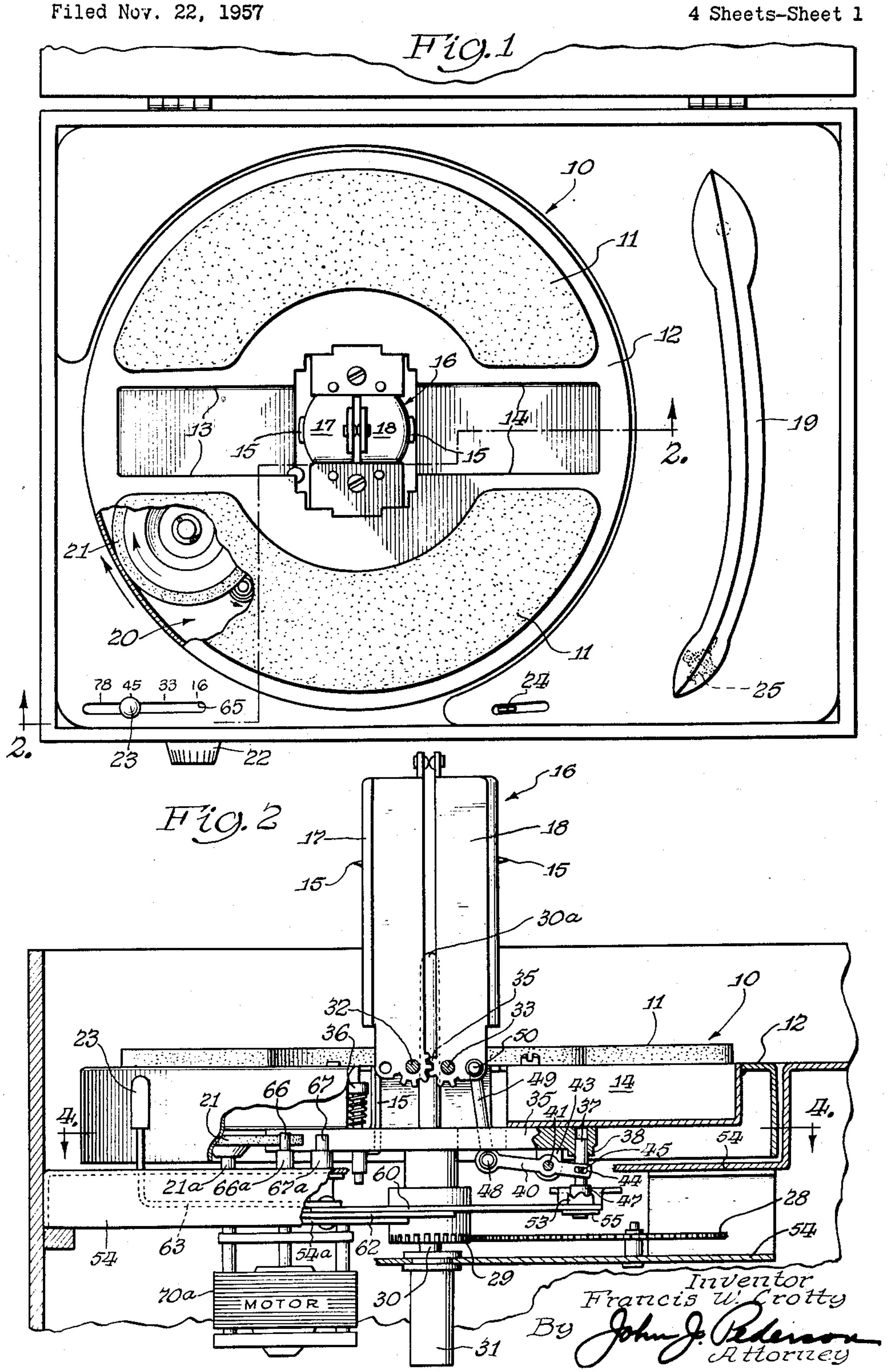

This invention relates to record players, and more particularly to an arrangement for establishing a predetermined turntable speed when certain components of the record player are placed in position for playing types of records that require such a speed. One machine to which the invention is especially applicable is disclosed in application Serial No. 648,713 of Maurice E. Hardy, filed March 26, 1957, and assigned to the same assignee as the present application.

The present state of the phonograph art is such that there are a wide variety of offerings of both record playing machines and records. For example, there are records of 7, 10 and 12 inch diameter for operation at 16, 33⅓, 45 and 78 r.p.m. Accordingly multiple speed phonographs are required for playing them. In addition, certain of the records require playing with a different type stylus than the other types; a three mil tip diameter stylus being required for the 78 r.p.m. record and a one mil tip diameter stylus being required for the other types. Moreover, the 45 r.p.m. records have larger centering apertures than the others and for that reason require a different size feeding mechanism where the phonograph is of the record storing and feeding type. In most such cases the records are stacked upon an upstanding magazine normal to the center of the turntable and equipped with automatic devices for sequentially dropping records to playing position in a record changing cycle in which the tone arm is concurrently moved to a position which clears the way for the record to move into place on the turntable and then returns it to its recording-playing position.

Accordingly, phonograph mechanisms, especially those of the record storing and feeding type, have become rather complex, and this is particularly true where the instrument is designed to accommodate all of the aforementioned records. The user must be very careful, for example, to adjust the driving mechanism properly so that the turntable rotates at the proper speed. Further it is necessary, when the automatic record changing is employed to make sure that the proper stylus is in operating position.

It is, therefore, an object of this invention to simplify phonograph mechanisms and avoid some of the complexities of prior devices.

It is a primary object of this invention to provide automatic speed control for a phonograph to establish the requisite turntable speed as the instrument is conditioned to play records of a rated speed.

A further object of the present invention is to provide an improved control mechanism for driving the turntable of an automatic record player at a predetermined speed commensurate with the rated speed of records that the mechanism is adjusted to play.

A still further object is to provide a stylus-selecting structure cooperating with an automatic speed control of a record changer for placing the appropriate stylus in operating position at the same time the correct speed is established for the turntable of the record changer.

In accordance with the present invention a phonograph comprises a turntable provided with a plurality of radially extending recesses and a record changer comprising a plurality of pivotally mounted segments. The segments, which are centrally disposed with respect to the turntable, are retractable to an inoperative position within the recesses and extendable to an operative position normal to the turntable so as to collectively define a first spindle for accommodating record discs characterized by a large centering aperture and designed to be rotated at one particular speed. A second spindle, coaxially encompassed by the pivotally mounted segments when they are extended to their operative position, is provided for accommodating record discs characterized by a small centering aperture and designed to be rotated at a second particular speed. The phonograph further includes a motor for driving the turntable and a variable drive ratio transmission which is connected between the motor and the turntable. Mechanical means, responsive to the position of the spindle segments, is employed for automatically adjusting the transmission so as to selectively effect first and second rotational speeds for the turntable when the spindle segments are moved between the operative and inoperative positions, respectively.

Figure 3:
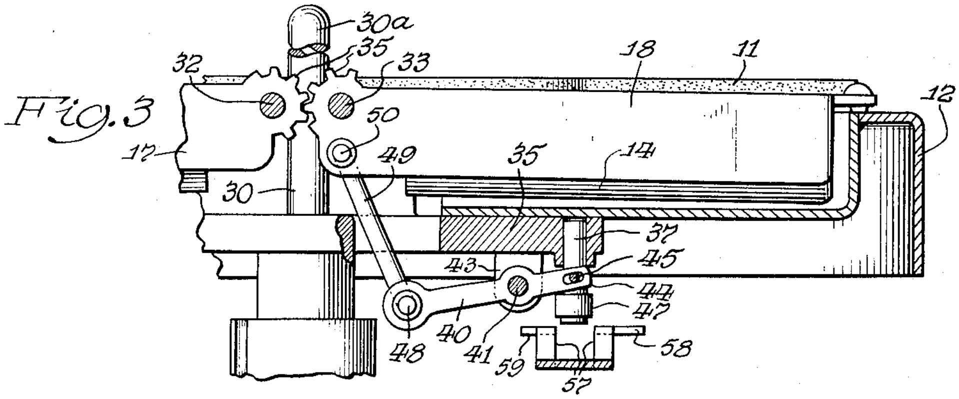
Figure 4:
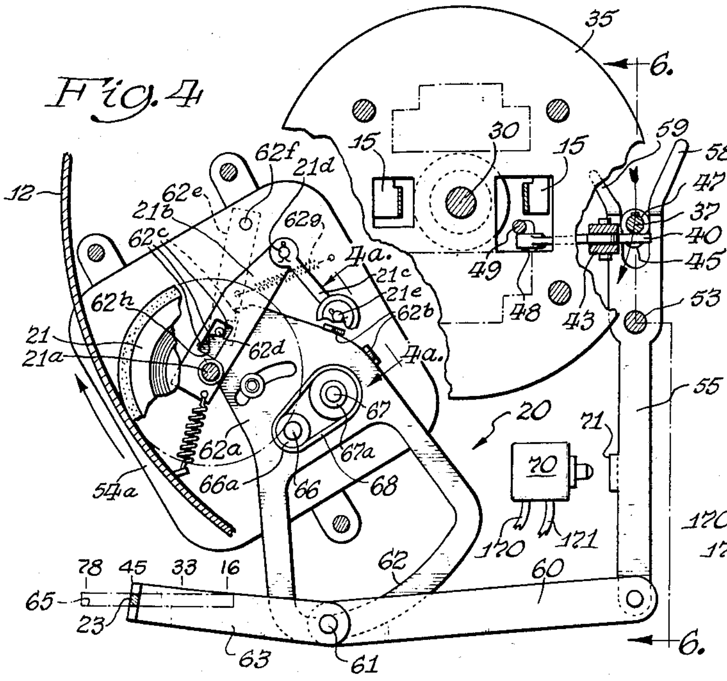
Figure 5:
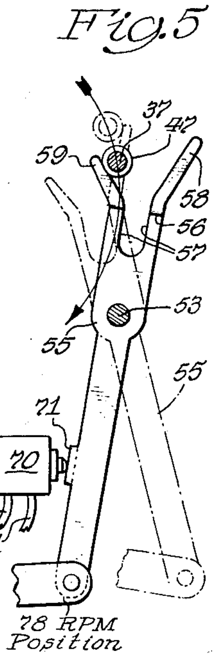
Figure 4A:
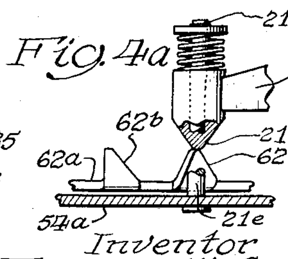
Figure 6:
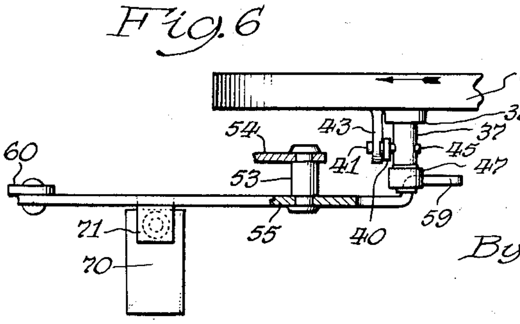
Figures 7, 8, 9:
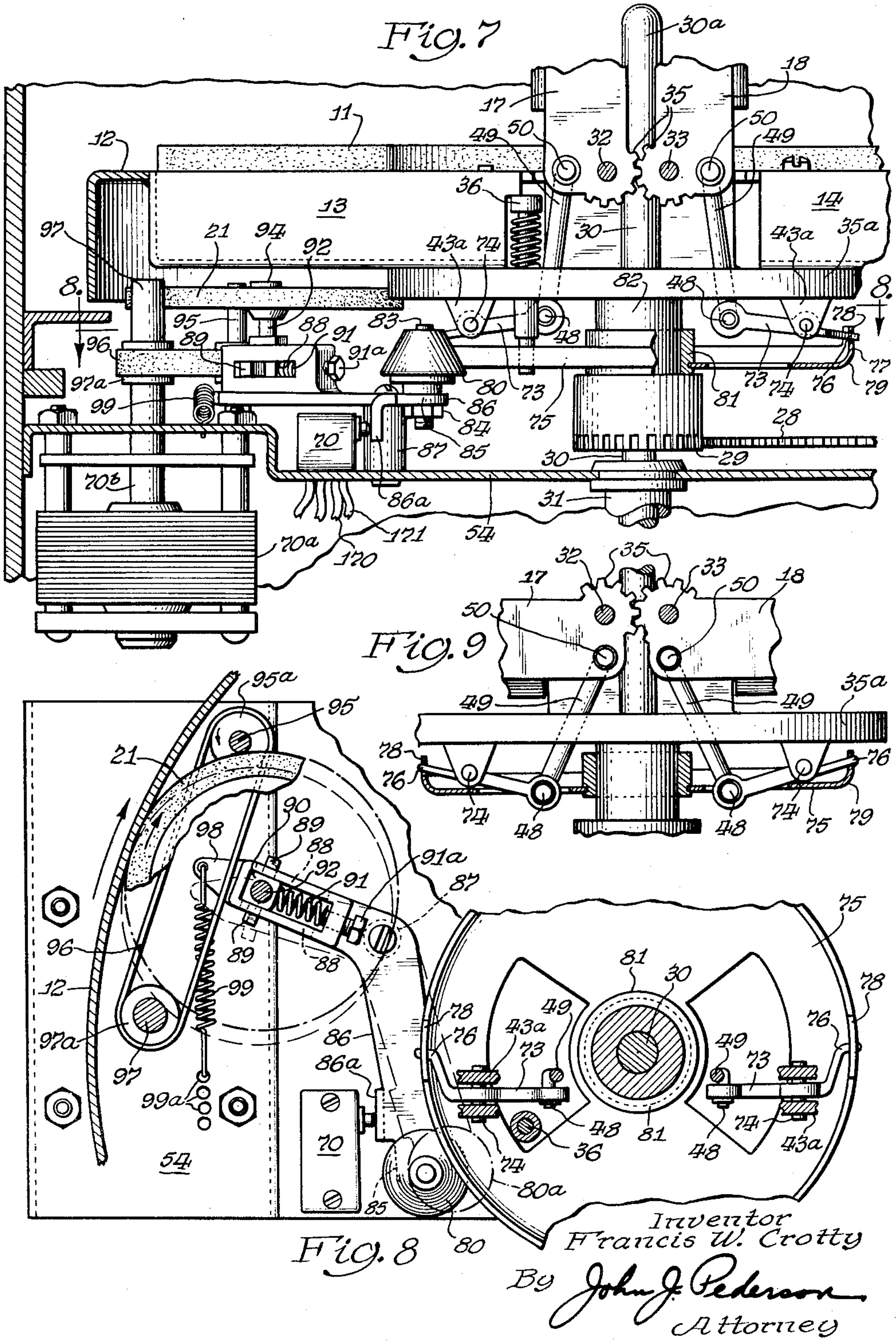

The features of the present invention which are believed to be novel are set forth with particularity in the appended claim. The organization and manner of operation of the invention, together with further objects and advantages thereof, may best be understood by reference to the following description taken in connection with the accompanying drawings, in the several figures of which like reference characters identify like elements, and in which:

Figure 1 is a plan view of a phonograph with the cover open and including the present invention, Figure 2 is a transverse sectional view taken substantially along the lines 2—2 of Figure 1, Figure 3 is an enlarged transverse sectional view similar to Figure 2, but showing the center post indexing means in a lowered position, Figure 4 is a plan view of certain parts of the invention, with other parts not shown for the purpose of clarity, Figure 4*a* is a partial sectional view taken on line 4*a*—4*a* of Figure 4, Figure 5 is a partial view of an operating linkage showing two positions of operation, Figure 6 is a partial sectional view taken along the line 6—6 of Figure 4, Figure 7 is a view similar to Figure 2 of a modification of the invention, but showing only part of the construction, Figure 8 is a partial plan view of the structure shown in Figure 7, Figure 9 is a partial view similar to the upper part of Figure 7 but showing the center indexing post in a retracted position, Figure 10 is a longitudinal sectional view of a styli control relay carried in the tone arm head, Figure 11 is a sectional view taken substantially on the line 11—11 of Figure 10, Figure 12 is a bottom view of the relay, Figure 13 is an A.C. powered circuit diagram, and Figure 14 is a battery powered circuit diagram.

Referring more particularly to Figure 1, the portable record player there illustrated, embodying the invention, comprises a rotatable turntable 10 having record supporting surfaces 11 that may be composed of cork or resilient material disposed upon a platen 12 provided with a pair of radially extending recesses 13 and 14. A record-changing assembly 16 for indexing and automatically dispensing large aperture record discs, such as the 45 r.p.m. records, is centrally disposed in respect to turntable 10, and comprises a pair of pivotally mounted separate halves 17 and 18. The record player further incorporates a tone arm 19 and a variable-speed driving mechanism 20 operably coupled to turntable 10 through a driving disc or wheel 21 disposed upon a mounting base which in turn is supported from a cabinet, not wholly disclosed in the drawings. A power switch including volume control 22, a speed selector knob 23, and a reject toggle arm 24 comprise the external controls of the record player. The speed selector knob 23 has four operating positions individually establishing a turntable speed corresponding to the rated record speeds of 16, 33, 45 and 78 r.p.m. The dotted line structure 25 within the head of the tone arm is a device, to be described in detail hereinafter for placing a selected one of a pair of styli in record-playing position. It is customary to provide two styli, one for 78 r.p.m. records and known as a three mil stylus, and the other for the other records mentioned above and known as a one mil stylus.

The upper end 30*a* of pin 30 forms an indexing device or spindle for small apertured records, such as 33 r.p.m. records, and is accessible for that purpose when segments 17 and 18 of the 45 r.p.m. changer 16 are retracted to their inoperative position as illustrated in Figure 3. The blades 15 of the record changer, which are manipulated to feed a record on to the turntable, are controlled by a mechanism shown only partially in the instant application and including a single revolution gear 28 that is rotated by a pinion 29 carried upon a pin 30 journaled in a bearing 31, suitably supported in a frame plate 54.

The phonograph as thus far described is fully disclosed in the above mentioned application and reference may be had thereto for the details of its construction and operation. Accordingly only a brief résumé of the operation will be given herein. For that purpose it will be assumed that segments 17, 18 are in the position shown in Figure 2, supporting a stack of 45 r.p.m. records, and it will be further assumed that one such record rests on turntable 10 and is being tracked by tone arm 19.

Upon the completion of the playing of the record, the tone arm enters the terminating section of the record groove which is cut to actuate the arm, in well-known manner, as a velocity trip device which initiates a record-changer cycle. Immediately, the tone arm is swung toward the periphery of the turntable, clearing the path of descent of records then stored on changer 16; and single revolution gear 28 is actuated. Cam controlled actuators driven by gear 28 operate blades 15 to release the bottom record of the record stack while restraining all others against movement so that one record only is fed to the turntable. Thereupon, tone arm 19 is restored to the start of its record-tracking cycle and is lowered upon the record.

To establish the phonograph in its alternate operating condition, segments 17 and 18 of the 45 r.p.m. changer are pivoted about pivots 32 and 33 and are thereby retracted into the position indicated in Figure 3. They now rest in recesses 13, 14 of platen 12 below the level of surfaces 11 and provide free access to spindle 30*a*. The instrument is now a manual-play device and can accommodate any of the records available on the market, even 45 r.p.m. records so long as the usual disc is inserted within the large centering aperture in order to give the record an effective centering aperture corresponding in size to spindle 30*a*. Of course, whatever record is placed in playing position on turntable 10 there must be a complementary adjustment of speed selector 23 and needle carriage 25 to insure appropriate turntable speed and tracking stylus.

In accordance with the embodiments of the invention under consideration, the speed of the turntable is automatically established at 45 r.p.m. whenever segments 17, 18 of the record changer are moved up into the position illustrated in Figure 2. The structure and manner of accomplishing this result are as follows.

A plate 35 is suitably secured to the bottom of recesses 13 and 14 of platen 12 in a manner not shown. A decoupling pin 36 is housed within recess 13 to be engaged by arm 17 when it is retracted in order to decouple the record-changing means which is only used when segment 17 is in its elevated position. Segments 17 and 18 carry mutually engaged gear sectors 35 so that they are constrained to rotate concurrently.

A pin 37 is slideably mounted in a boss 38 in plate 35 to be reciprocated upwardly and downwardly; and it is shown in the downward position in Figure 2. The pin is moved by a lever 40 carried on a pivot 41 mounted in ears 43 depending from the bottom surface of plate 35. The right hand end of lever 40 is provided with a slot 44 that receives a pin 45 secured to pin 37. The opposite end of lever 40 is provided with a pivot 48 connected with a link 49, in turn, secured to pivot 50 carried by changer segment 18. When segment 18 is in the position shown in Figure 2 lever 40 displaces pin 37 to its lowermost position, and when segment 18 is retracted as shown in Figure 3, lever 40 raises an enlarged operative end 47 journaled on pin 37 to its uppermost position in which it is free and clear of other operating parts to be described below.

The parts described above rotate with turntable 10 and they are adjusted when the turntable is at rest. It may be desirable that operating end 47 be mounted to pin 37 in a resilient manner so that it may move upwardly if there is interference at the time of adjustment. However, in the instant modification, other provisions are made for such contingency.

The parts of the change-speed mechanism that are mounted upon fixed portions of the phonograph will now be described. A pivot post 53, shown in Figures 4, 5 and 6 is suitably secured to a frame member 54 (Figures 2 and 6) and pivotally mounts a lever 55 formed of suitable spring stock to give resiliency to the entire adjusting mechanism. The upper end of lever 55, as viewed in Figures 4, 5 and 6, has an offset 56 at each of two sides of a slot 57 forming a fork having camming tines 58 and 59. As best shown in Figures 4, 5 and 6, the enlarged end 47 of pin 37 engages tines 58 and 59 in its path of rotation when pin 37 is in its lowermost position. As best shown in Figure 3, end 47 clears tines 58 and 59 when pin 37 is in its uppermost position. The opposite end of lever 55 is connected to a link 60 that, in turn, is pivoted on a pin 61 carried on an arcuate segment 62. A link 63 is also pivoted on pin 61 and at its opposite end connects to adjustment knob 23 movable in a slot 65 (Figure 1) to manually position the drive adjustment mechanism 20 between the 16, 33, 45 and 78 r.p.m. positions.

The details of the variable-drive mechanism 20, per se, form no part of the present invention and will be described only briefly to explain the general construction and operation; it being commercially available and well understood in the art. With the mechanism 20 in the position shown in Figures 1 and 4 the drive wheel 21 will turn the platen 12 at 45 r.p.m. When the speed selector 23 is moved to the 78 r.p.m. position, drive wheel 21 turns platen 12 at 78 r.p.m. With knob 23 in place in either the 16 or 33 r.p.m. control positions, drive wheel 21 turns platen 12 at these selected speeds.

Positioning the segment 62 causes different cam surfaces to raise or lower drive wheel 21 with respect to the driving surfaces of drive pulleys 66 and 67. These pulleys 66 and 67 are shouldered at 66*a* and 67*a* as indicated in Figures 2 and 4, and consequently have areas of different diameters for providing different speeds of rotation. Accordingly the drive wheel 21 is cammed away from the pulleys 66 and 67 between drive positioning changes.

The segment 62 is part of a plate 62*a* pivotally supported upon a sub-base 54a secured to the base 54, coaxially with drive pin 66. Pulley 66 is mounted on the shaft of motor 70a, and is connected by a belt 68 to the pulley 67 journaled on plate 62a. Drive wheel 21 is journaled on a spring biased movable linkage, including pin 21a secured to a lever 21b pivoted to a link 21c by a pin 21d. The link 21c is slideable vertically upon a post 21e secured to plate 54a, and is spring biased downwardly so a cam surfaced bottom 21f (Figure 4a) of link 21c engages struck up cams 62b on the plate 62a to raise and lower the above described linkage toward and away from the plane of the drawing (Figure 4). Thus the wheel 21 is vertically adjusted to be engaged selectively by surfaces of pulleys 66 and 67 above and below the shoulders 66a and 67a. In moving up and down radial cams 62c act (against the bias of a spring 62g) upon a pin 62d on a bar 62e pivoted at 62f to sub-base 54a. The pin 62d engages a surface 62h to move the lever 21 upward clear of pulleys 66 and 67. At each speed setting the dwells between cams 62c permit the wheel to contact pulleys 66 or 67.

It is desirable to change the needle when the speed adjustment mechanism is set to play 78 r.p.m. records and accordingly a switch 70, to be described more in detail below, is engaged by a tab 71 carried on the lever 55 and changes circuitry to be described below when the adjustment device is in the position indicated in Figure 5. As shown in Figure 4, switch 70 is not engaged; hence different circuitry is established for all positions other than the 78 r.p.m. position.

*Operation (Figures 1 through 6)*

When the 45 r.p.m. spindle record changer 16 is erected to operating position, pin 37 is in its lowest position, shown in Figures 2 and 4, and its cap 47 will engage one or the other of the tines 58, 59 of lever 45 if the speed selector 23 is set to any speed other than 45 r.p.m. For example, if knob 23 is resting at the 78 r.p.m. position, the relation of cap 47 to the forked end of lever 55 will be that shown in full lines in Figure 5. As the turntable rotates, cap 47 engages tine 59 and cams linkage 55, 60, 62 into the position represented in Figure 4, establishing the turntable speed at 45 r.p.m. In the event that knob 23 has been previously adjusted to either the 33 or 16 r.p.m. positions, cap 47 will engage tine 58 to move the linkage to the position indicated in the Figure 4. In this position of the parts, cap 47 will, on succeeding revolutions of turntable 10, pass through fork tines 58, 59 without engagement. Hence, when the proper speed has been established it will be maintained.

In the event the mechanism 16 is erected while the turntable is at such a position of rest to bring cap 47 down upon either of tines 58 or 59, they will yield to permit pin 37 to descend. Then cap 47 will effect its adjustment of the driving system as it completes one revolution. Accordingly, when spindle 16 is placed in operable position, the drive mechanism is automatically adjusted to play 45 r.p.m. records at the proper speed, and the automatic record-changing mechanism is concurrently brought into operation.

*Automattic two speed modification (Figures 7–9)*

The spindle halves 17 and 18 are coupled through pivot pins 50, a pair of links 49, pivot pins 48, to a pair of levers 73 carried on pivot pins 74, in turn, mounted in ears 43a depending from plate 35a to be rotated as a unit with the turntable. Levers 73 terminate in pins 76 that project through holes 77 in a flange 78 of disc 75. The curved portion 79 of flange 78 engages a roller 80 to effect speed adjustments in a manner to be described. The disc 75 is secured to a slide bearing 81 carried around an extension 82 of the plate 35a. It is preferred that this sliding action be easily accomplished and accordingly a suitable dry lubricant such as molybdenum sulphide or colloidal carbon is burnished on the sliding surfaces. With the spindle segments 17 and 18 in the raised position, the ends 76 of levers 73 are urged downwardly and disc 75 is in its lowermost position shown in Figure 7. With segments 17 and 18 retracted into their respective recesses 13 and 14, disc 75 is raised to the position shown in Figure 9, permitting follower 80 to assume the broken-line position shown in Figure 8 for a function to be hereinafter more fully described.

The structure connected to base 54 and cooperating with disc 75 to effect speed changes will now be described. Follower 80 is journaled on a pin 83 secured by a nut 84 to one end 85 of a lever 86. The lever 86 is pivoted on a post 87 suitably secured to base 54. The other end of lever 86 has a pair of parallel slots 88 through which a pin 89, secured to a block 90 projects and is urged in a left-hand direction, as viewed in Figure 8, by a spring 91. The tension of spring 91 is adjustable by means of a set screw 91a. The block 90 supports an upstanding post 92 which mounts the hub 94 of drive wheel 21 so that the drive wheel engages the internal surface of the depending flange 12 of the platen. The periphery of drive wheel 21 is selectively engaged by either a drive pulley 95 to turn the platen 12 at 45 r.p.m. or a pulley 97 proportioned to establish 78 r.p.m. operation for platen 12. Pulley 97 is connected by motor shaft 70b to motor 70a while belt sheaves 95a and 97a and belt 96 effect a driving connection to pulley 95.

The distal end 98 of lever 86 is biased by a spring 99, adjustably secured in an adjustment hole 99a in base plate 54, to urge follower 80 against the curved surface 79 of disc 75. Consequently, when disc 75 is raised, follower 80 is displaced to the right, as viewed in Figure 8, under the influence of spring 99 and drive wheel 21 is shifted to the broken line position. It is to be noted that spring 91 at all times urges drive wheel 21 into engagement with the inside surface of platen 12 and either of drive pulleys 95 or 97. The force of engagement thereby exerted is directed toward pivot 87; hence the entire force of spring 99 is directed to pressing the surface of drive wheel 21 into engagement with drive pulley 97. With the parts in the position shown in Figure 8 the force obtaining between the follower 80 and the edge of the disc 75 is reduced by the bias of the spring 99 in exerting force upon the drive pin 95. Accordingly, suitable spring constants for the arm 86 and spring 99 are selected. For best results, the spring 99 exerts approximately half of the force of engagement of the disc 75 with the follower 80 to obtain substantially equal pressure of pulleys 95 and 97 upon disc 21.

*Operation of the modification shown in Figures 7, 8 and 9*

For the purpose of explanation, assume that the spindle segments 17, 18 are in the position shown in Figure 7. Disc 75 is in its lowest position and cam follower 80 is urged to a left hand position as viewed in Figure 8. As a result, drive wheel 21 is in engagement with the drive pulley 95 and platen 12 is driven at 45 r.p.m. When segments 17, 18 are restored to their inoperative positions, as shown in Figure 9, the disc 75 assumes its uppermost position. Cam follower 80 takes the dotted-line position 80a, shifting drive wheel 21 out of engagement with pulley 95 and into engagement with pulley 97 to cause rotation of platen 12.

As pointed out in the embodiment of Figures 1–6, the stylus arrangement 25 of the tone arm 19 may include a pair of styli which are selectively operable in accordance with the type record to be played. The structure of the arrangement and suitable control circuits for making the selection will now be described.

Referring to Figures 10, 11 and 12 there is shown an electrically actuated device 25 for changing styli to cooperate with the type record 150 carried by the turntable 10. Tone arm 19 is constructed of light metal or plastic and has enlarged head 151 that opens at the bottom 152 so that stylus may project into contact with record 150. At the top of the head 151 there is a pair of shoulders 156 to receive screws 157 that secure support arms 158 of the needle changing mechanism 25.

The arms 158 are tack welded to a U-shaped soft iron core 160 forming a flux path for a winding 161 energized by a circuit to be described below. The member 160 has a pair of pole ends 162 and 163. The end 163 is provided with a pair of struck in ears 164 and 165 serving as stops for a permanent magnet 166. The coil 161 is connected by wires 170 and 171 to the switch 70 shown above in Figures 4, 5, 7 and 8, to select one or the other of a pair of styli 154 or 155 in accordance with the operating condition of the switch 70.

The permanent magnet 166 is cast with a hole 172 for cementing the magnet upon a pin 173 which has a head portion 174 bearing against one of two identical clips 175. The clips are apertured to accommodate pin 173 and have ears 176 for snapping into place in notches 177 provided in the pole ends of magnet legs 162 and 163 to support the permanent magnet in position and provide suitable bearings therefor. The clips 175 are preferably of brass and pin 173 is preferably of hard steel to provide a simple but effective bearing.

A needle carriage 180 is cemented to the end 181 of pin 173. The magnet 166 may be displaced between full-line and dotted-line positions of Figure 11, being restricted to substantially 90 degrees in its motion by stops 164 and 165. The styli carrying arms 182 and 183 are positioned at 90 degrees on a cartridge 185 that plugs into the pickup 180 with suitable electrical jacks (not shown) connected over leads 186 and 187 to the amplifying portion of the phonograph in well known manner.

The stylus changing mechanism may be operated from A.C. or D.C. sources. Figure 13 discloses the circuitry for A.C. operation. With the blades of swtich 70 in the solid-line position of that figure, coil 161 is energized from an A.C. source 190 through a full wave rectifier 191 as follows: from the upper junction 192 of the rectifier 191 through a smoothing inductor 193, wire 194, the upper blade of switch 70 and wire 170 to coil 161. From coil 161 the circuit is completed through wire 171, the lower blade of switch 70, and wires 195 and 196 to the lower junction 197 of rectifier 191. With the switch blades in the dotted-line position the opposite flow of the current is effected because of the reversing connections 198 and 199 and the polarization of relay 161 is likewise reversed. With the reverse polarization the permanent magnet 166 is shifted from the full-line to the dotted-line position indicated in Figure 11. In one position a one mil stylus becomes operative and in the other position a three mil stylus becomes operative. In either position the permanent magnet serves as a detent to maintain the styli firmly in position.

In the embodiment of the invention shown in Figures 1–6 when arms 17 and 18 are raised the switch 70 and styli control mechanism 25 is conditioned to present the one mil stylus for tracking 45 r.p.m. records. When control lever 55 is manually placed in the position shown in Figure 5 the switch and connected control styli mechanism 25 is conditioned to present the three mil needle for tracking 78 r.p.m. records. In the embodiment shown in Figures 7–9 the automatically operated bell crank 87 conditions the switch 70 and mechanism 25 for 45 r.p.m. operation in the full line position shown in Figure 8, and for 78 r.p.m. operation in the broken line position.

The arrangement illustrated in Figure 14 is designed for a battery-operated portable record player and the switch **70*b* is provided with switch arms that will require only momentary power to cause displacement of the permanent magnet 166 and a change of styli. Figure 14 diagrammatically shows switches 202 that are actuated to change the polarity of coil 161 upon movement of the adjustment arm 55 (or bell crank 87 described in connection with Figures 7–9) to push the plunger 203 of the switch 70*b*. The plunger is provided with a plurality of notches 204 that have switch tripping septums 205 therebetween cooperating with ends of a pair of switch blades 206. The switch blades 206 may contact momentarily switch blades 207, 208 and 209 to establish the following circuits. With the arm 55 in the position shown and moving toward the left as indicated by the arrow contacts 210 and 211 are closed momentarily and the following circuit is established: From the top of the battery 212, through a center switch blade 208, the right hand switch blade 206, wire 214, coil 161, wire 215, the left hand switch blade 206, switch blade 207 and wires 216 and 217 to the bottom of the battery. Upon further motion of the arm 100 toward the left, the ends of switch blade 206 ride up from under the septums 205 and snap into different notches 205 in which overtravel is prevented by the opposite shoulders by engagement with the septums and ends of switches 206 in this new position. When the arm 55 is moved toward the right, the bias of a spring 203*a* will move the switch blades 206 toward the right and cause same to make contact with contacts 219 and 220. Such movement of the arm 110 will result in the following circuit: From the top of the battery 212 through the central switch blade 208, the left hand switch 206, wire 223, coil 161, wire 224, right hand switch blade 206, switch blade 209 and wires 225 and 217 to the opposite side of the battery 212. Accordingly, the polarity of the winding 161 is momentarily reversed with respect to the polarity of energization described above and reversal of position of the magnet 166** (Figure 11) will be effected in the same manner as described in connection with Figure 13.

It is to be noted that in the device disclosed in Figures 7 and 8 the switch 70 is actuated by the ear **86*a* on the speed control bell crank 86. Hence needle change is effected automatically with change of position of the center post 16**.

In accordance with the foregoing description, a phonograph is provided with automatic control of speed established by movement of a record centering mechanism between two predetermined positions inherent for proper operation of the phonograph. In addition, the styli are automatically positioned properly for tracking records requiring different types of styli. Each of the new functions are accomplished in a manner inhibiting the possibility of misadjustment for desired operating characteristics.

While particular embodiments of the invention have been shown and described, it will be obvious to those skilled in the art that changes and modifications may be made without departing from the invention in its broader aspects, and, therefore, the aim in the appended claim is to cover all such changes and modifications as fall within the true spirit and scope of the invention.

I claim:

A phonograph comprising: a turntable provided with a plurality of radially extending recesses; a record changer comprising a plurality of pivotally mounted segments centrally disposed with respect to said turntable, retractable to an inoperative position within said recesses and extendable to an operative position in which said segments are normal to said turntable and collectively define a first spindle for accommodating a record disc having a large centering aperture and designed to be rotated at one particular speed; a second spindle, coaxially encompassed by said segments when they are extended to said operative position, for accommodating record discs having a small centering aperture and designed to be rotated at a second particular speed; a motor for driving said turntable; a variable drive ratio transmission connected between said motor and said turntable; and mechanical means responsive to the position of said spindle segments for automatically adjusting said transmission to selectively effect said first and second rotational speeds for said turntable when said spindle segments are moved between said operative and inoperative positions respectively.

References Cited in the file of this patent

UNITED STATES PATENTS 2,113,401 Goldsmith ------------ Apr. 5, 1938

2,660,896 Hartman -------------- Dec. 1, 1953
2,673,089 Osborne --------------- Mar. 23, 1954
2,718,399 Martin et al. ----------- Sept. 20, 1955

FOREIGN PATENTS 743,522 Great Britain ------------ Jan. 18, 1956